United States Patent [19]
van Heek et al.

[11] 4,386,942
[45] Jun. 7, 1983

[54] PRODUCTION OF $H_2$ AND CO-CONTAINING GASES

[75] Inventors: Karl H. van Heek, Essen-Heisingen; Harald Jüntgen, Essen; Werner Peters, Bochum, all of Fed. Rep. of Germany

[73] Assignee: Bergwerksverband GmbH, Essen, Fed. Rep. of Germany

[21] Appl. No.: 357,875

[22] Filed: Mar. 15, 1982

Related U.S. Application Data

[63] Continuation of Ser. No. 117,973, Feb. 4, 1980, abandoned.

[30] Foreign Application Priority Data

Feb. 9, 1979 [DE] Fed. Rep. of Germany ....... 2903985

[51] Int. Cl.³ ............................................... C10J 3/54
[52] U.S. Cl. ........................................ 48/202; 48/206; 48/DIG. 4; 252/373
[58] Field of Search .................. 48/202, 206, DIG. 4; 201/31, 38; 252/373

[56] References Cited

U.S. PATENT DOCUMENTS

| | | | |
|---|---|---|---|
| 2,588,075 | 3/1952 | Bon et al. | 48/206 |
| 4,080,181 | 3/1978 | Feistel | 48/99 |
| 4,135,889 | 1/1979 | Mori | 48/206 |

*Primary Examiner*—Peter F. Kratz
*Attorney, Agent, or Firm*—Michael J. Striker

[57] ABSTRACT

Product gas is produced by partial gasification of coke or coal. The coke or coal is admitted in particulate form into a gasification zone where it undergoes partial gasification. The residue of coke or coal is then forwarded into a combustion zone where it is combusted to liberate heat. A gaseous heat carrier is first passed through the combustion zone to become heated therein, is then passed through the gasification zone to sustain the partial gasification process, and is then recirculated into the combustion zone to be reheated.

10 Claims, 2 Drawing Figures

PRODUCTION OF H$_2$ AND CO-CONTAINING GASES

This is a continuation of application Ser. No. 117,973, filed Feb. 4, 1980 now abandoned.

BACKGROUND OF THE INVENTION

This invention relates to the generation of product gases.

More particularly, the invention relates to the production of H$_2$ and CO-containing gases.

Still more specifically, the invention relates to the production of gases of the kind mentioned above, from particulate solid fuels such as coal or coke.

The basic concept of making such gases is already known. The purpose is to convert coal or coke into a product gas which can be further employed in a multitude of applications, for example as a source of chemicals, as a reduction gas or as a substitute for increasingly scarce natural gas. The main problem encountered in the production of such gases is the supply of the heat required in order to effect gasification of the coal or coke with such known gasifying agent as steam (water vapor).

Proposals have been made in the prior art for effecting steam gasification of coal in a fixed-bed reactor, in a fluidized-bed reactor or in suspension (i.e., in cloud form). The required heat is supplied in these processes either autothermically (reaction heat is produced in the gas generator by partial combustion of the coal by adding certain quantities of oxygen to the steam used as a gasification agent) or allothermically (heat is produced externally of the gas generator by combusting coal or other fuel and is introduced into the gas generator via a heat carrier, e.g., partially combusted coal particles or ceramic bodies). The autothermic method requires, as mentioned above, the addition of oxygen. This is a draw-back for many applications since it means that pure oxygen must be produced in a special installation and must then be mixed with the steam, since air cannot be used in place of oxygen because its nitrogen content would undesirably influence the resulting product gas composition.

Also known from the prior art is a process of steam-gasification using superheated steam as heat-carrier. However, due to the low specific heat of steam even high-level superheating—e.g., in excess of 1100° C.—results only in gasification at relatively low temperatures. Therefore, this process is suitable only for highly-reactive coal, such as lignite. Also, it requires the use of substantially greater quantities of steam (for heating) than is needed for the actual gasification reaction. In addition, the steam generator and the condensers must be much more elaborate (and hence expensive) than would be required for the gasification process per se.

SUMMARY OF THE INVENTION

Accordingly, it is an object of the invention to avoid the prior-art disadvantages.

A more specific object of the invention is to provide an improved method of producing H$_2$ and CO-containing gases.

Another object is to provide a method in which the heat necessary for steam (water vapor) gasification of coal or coke can be produced in a simple manner and in a single reactor, by combustion of fuel residue which remains after gasification of the fuel—and transferring the resulting heat to the starting coal or coke (i.e., the fuel to be gasified) via indirect heat exchange.

A concomitant object is to provide an apparatus for carrying out the inventive method. These objects are attained, in accordance with the the present invention, by the steps of admitting particulate solid fuel into a fluidized bed in a gasification zone; effecting partial gasification of the admitted solid fuel in the presence of steam and with the aid of heat supplied by a gaseous heat-carrier circulating in heat-exchanger tubes through the fluidized bed, with resultant generation of gas and of a solid-fuel residue; passing the solid-fuel residue into a fluidized bed in a combustion zone downstream of the gasification zone and combusting it therein in the presence of air so as to generate heat; circulating the gaseous heat-carrier in heat-exchanger tubes through the combustion zone to become heated before circulating it through the gasification zone; and recirculating the spent gaseous heat-carrier from the gasification zone back to the combustion zone to become reheated therein.

In a further development of the invention the gasification zone may be preceded by zone for devolatilization or pyrolysis in which there may also be bed fluidized with steam.

Advantageously the fluidized beds are operated at elevated gas pressure of 5–60 bar (preferably 20–40 bar). The outgassing zone is operated at 500°–800° C. (preferably 700° C.), the gasification zone at 700°–870° C. (preferably 790°–840° C.) and the combustion zone at 900°–1050° C. (preferably 950° C.).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
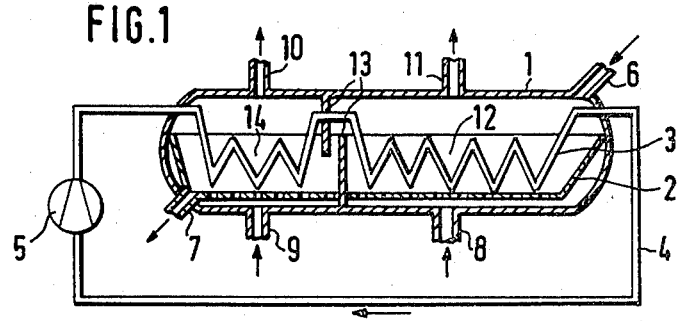
FIG. 1 is a somewhat diagrammatic vertical section through an apparatus according to one embodiment of the invention.

Discussing first the embodiment of FIG. 1 which is of a two-zone gas generator, it will be seen that the gas generator is designated in toto with reference numeral 1. It has a horizontal, cylindrical container, in the lower area of which a tub 2 is formed. The tub 2 has a perforate bottom wall which is upwardly spaced from the bottom wall of the container, to form therewith a gap. The interior of tub 2 is subdivided by an upright split partition 13 into a gasification zone in which a fluidized bed 12 is maintained and a combustion zone wherein a fluidized bed 14 is maintained. Particulate coal or coke is admitted to the gasification zone via inlet 6; it is fluidized to form fluidized bed 12, by admission of steam through inlet 8 into gap 1c from where it passes upwardly through perforated bottom wall in uniform flow. The particulate coal or coke reacts with the steam and in the presence of requisite heat undergoes gasification, liberating a product gas rich in $H_2$ and CO. This gas is vented through outlet 11.

The fuel particles are only partially used in this gasification stage or zone. A residue remains (now in form of coke, even if coal was originally admitted) and flows via the split in partition 13 (which acts as a weir or syphon) into the combustion zone. Air is admitted into the gap beneath zone 14 via inlet 9; this air rises upwardly through perforated bottom wall into the combustion zone and fluidizes the fuel residue to form fluidized bed 14 in which the fuel residue is combusted in the presence of the air from inlet 9. The resulting combustion gases are vented through outlet 10 and the ash generated by the combustion process is withdrawn through outlet 7.

It will be evident from the above that the movement of particulate matter is from inlet 6 towards outlet 7 in generally horizontal direction. This flow results from the fact that the fluidized beds 12 and 14 behave like fluids as is known per se so that—given the withdrawal of ash at 7 and the admission of material at 6—a flow develops in direction from inlet 6 to outlet 7.

The purpose of the combustion zone with its fluidized bed 14 is to produce the heat required to operate the gasification reaction in the fluidized bed 12 of the gasification zone. The transport of heat into bed 12 is effected via a heat-carrier circuit 4 in which a suitable gaseous medium, such as helium, is circulated by means of a blower 5. The circuit 4 has heat-exchanger section 3 located in the bed 14 and in the bed 12. The heat-exchange medium travels in the direction of the arrow and thus passes first through section 3 where it is heated up by heat exchange with the fluidized bed 14. It then flows into the section 3 where it exchanges heat with the bed 12, i.e., yields its heat to the coal or coke particles and to the bed 12 so as to produce the temperature required to sustain the gasification reaction.

It is, of course, preferably (because most economical) to so operate the beds 12 and 14 that just enough fuel particles move from bed 12 into bed 14 per unit time for the bed 14 to operate satisfactorily, i.e., to heat the helium or other heat carrier in circuit 4 to a temperature just sufficient to yield up to the bed 12 the heat required to sustain the gasification reaction. Persons conversant with this art can readily achieve this by appropriate selection of the volumes of beds 12 and 14, and by adjusting the flow speed of fuel into and out bed 12. Some slight empirical determination may be required for this purpose, but there is no need for undue experimentation.

Figure 2:
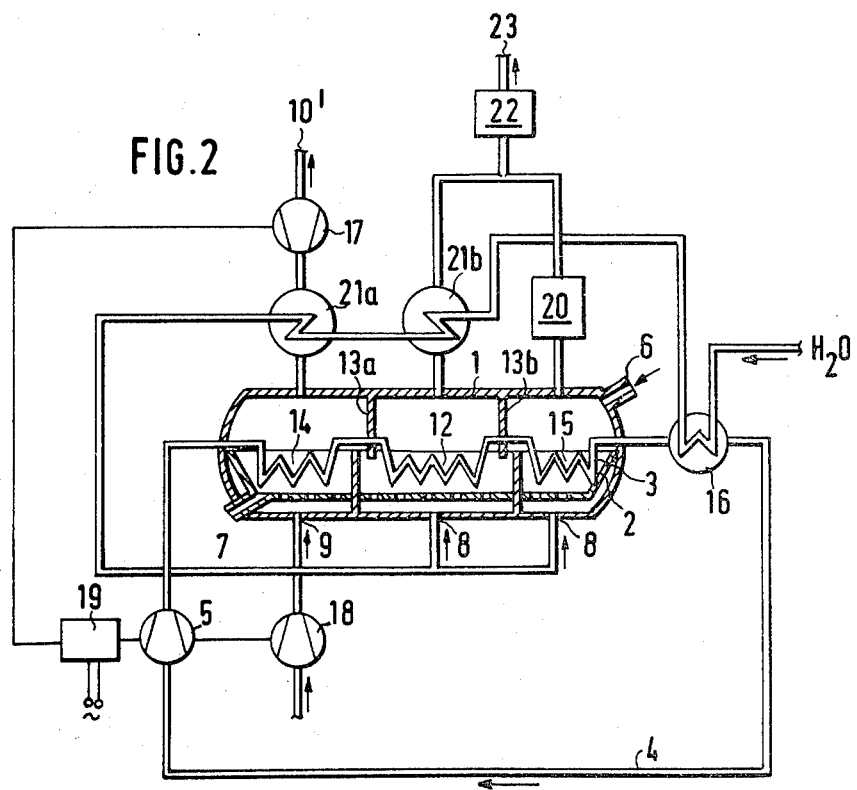
FIG. 2 is a view similar to FIG. 1 but showing a second embodiment.

The embodiment of FIG. 2 is largely the same as the one in FIG. 1 and like elements are therefore designated with like reference numerals and will not be further discussed. In FIG. 2, however, the reactor 1 includes additionally an devolatilisation zone having a fluidized bed 15, which is located upstream of the gasification zone as considered with reference to the direction of fuel movement through the reactor. This is especially advantageous when types of coal are used as fuel which, on heating to about 400°-600° C., yield substantial quantities of gaseous and/or liquid pyrolysis products (known per se). The use of the additional zone with bed 15 permits these valuable by-products to be separated out in a simple manner. The admission of the coal through inlet 6 into bed 15 may be effected in form of a jet of coal particles; this manner of admission is not affected by the caking tendencies of this type of coal.

Also shown in FIG. 2, in diagrammatic form, are other components of the overall installation. It will be seen that the heat carrier (e.g., helium) in circuit 4 travels through section 3 to yield up heat to bed 15. From there it enters an evaporator 16 to yield up further heat and produce, in the process of so doing, the steam required for operation of the beds 12 and 15; it is then recirculated via blower 5.

The devolatilisated product (raw gas) is vented from bed 15 via an outlet and admitted into a scrubber 20 for cleaning. The gas from bed 12 and the gas from bed 14 are cooled in coolers 21a and 21b, respectively. The steam for operating beds 12 and 15 is admitted from below through lines 8; air for operation of bed 14 is admitted from below via air-compressor 18 and line 9 into bed 14. The air and the steam have the secondary function of each acting as the fluidizing gas for the beds 12, 14 and 15, respectively.

It is advantageous to mix the gases from beds 15 and 12 via a connecting branch and to supply them to a converter stage 22 (known per se) where they are converted into the desired final product gas 23. The stage 22 may e.g., effect a conversion to produce a synthesis gas having a desired ratio of CO and $H_2$, or it may effect methanization to produce methane gas. The combustion gas 10' from bed 14 is passed through an expansion turbine and then discharged. Turbine 17 may be mounted on a shaft which is also common to the air-compressor 18, the blower 5 and an electrical motor or generator 19 so as to recover as much energy as possible from the combustion gas.

Steam from evaporator 16 may be passed through the gas coolers 21a and 21b, so that the steam is superheated by utilizing the sensible heat of the gases.

EXAMPLE

A quantity of 70 t/h coal is admitted into a gas generator according to FIG. 1, of 50 m length and 6 m diameter and having adjacent gasification and combustion zones. Gasification is effected at 785° C. and at 40 bar pressure, yielding 170,000 $Nm^3/h$ of raw gas. The gas is cleaned, yielding 11.75 t/h of tar. Non-combusted residual coke from the gasification zone is caused to enter the combustion zone, wherein 24 t/h of such coke is combusted.

The heat carrier in this system is helium which cools down to 800° C. from 900° C. in the gasification zone. In the evaporator the helium produces process steam and as a result cools down further by 75° C. until it reaches 725° C. The amount of process steam generated for use in the fluidized bed of the gasification zone, with the aid of the helium, is 185 t/h of steam.

The fluidized bed of the combustion zone receives 193,000 $Nm^3/h$ of air and combustion takes place at 950° C.

While the invention has been illustrated and described as embodied in production of $H_2$ and CO-containing gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of generating product gases by partial gasification of particulate solid fuel constituted by coke or coal, by the steps of admitting particulate solid fuel into a gasification zone of a reactor; effecting partial gasification of the admitted solid fuel in the presence of steam and with the aid of heat supplied by a heater immersed into the gasification zone, with resultant generation of gas and a solid-fuel residue; passing the solid-fuel residue into a combustion zone of the reactor downstream of and horizontally adjacent to the gasification zone and combusting it therein in the presence of air so as to generate heat for said heater, the improvement comprising the separate use of a first and a second fluidized bed for said gasification zone and said combustion zone respectively, with generally horizontal flow of said fuel from said gasification zone to said combustion zone with removal of ash from said combustion zone and circulating a suitable gaseous medium in a closed circuit, by means of a blower in heat-exchanger tubes through the combustion zone to become heated before circulating it in further heat-exchanger tubes through said gasification zone; and recirculating the spent gaseous medium from said gasification zone back to said combustion zone to become reheated therein.

2. A method as defined in claim 1; and further comprising the step of maintaining said fluidized beds at a gas-pressure of about 5–60 bar.

3. A method as defined in claim 1; and further comprising the step of maintaining said fluidized beds at a gas-pressure of about 20–50 bar.

4. A method as defined in claim 1, comprising the step of operating said gasification zone at a temperature of 700°–870° C. and said combustion zone at a temperature of 900°–1050° C.

5. A method as defined in claim 1, comprising the step of operating said gasification zone at a temperature of 790°–840° C. and said combustion zone at a temperature of about 950° C.

6. A method as defined in claim 1; further comprising the step of initially admitting the particulate solid fuel into a fluidized bed in andevolatilisation zone; and effecting devolatilisation of the fuel in the outgassing zone in the presence of steam before admitting the fuel into the gasification zone.

7. A method as defined in claim 6; and comprising the step of operating said fluidized beds at a gas-pressure of about 5–60 bar.

8. A method as defined in claim 6; and comprising the step of operating said fluidized beds at a gas-pressure of 20–50 bar.

9. A method as defined in claim 6; and comprising the step of operating said devolatilisation zone at a temperature of 500°–800° C., said gasification zone at a temperature of 700°–870° C. and said combustion zone at a temperature of 900°–1050° C.

10. A method as defined in claim 6; and comprising the step of operating said devolatilisation zone at a temperature of about 700° C., said gasification zone at a temperature of 790°–840° C. and said combustion zone at a temperature of about 950° C.

* * * * *